INVENTOR.
ELTON J. JACOBSON
BY
Akel C. Benson
ATTORNEY

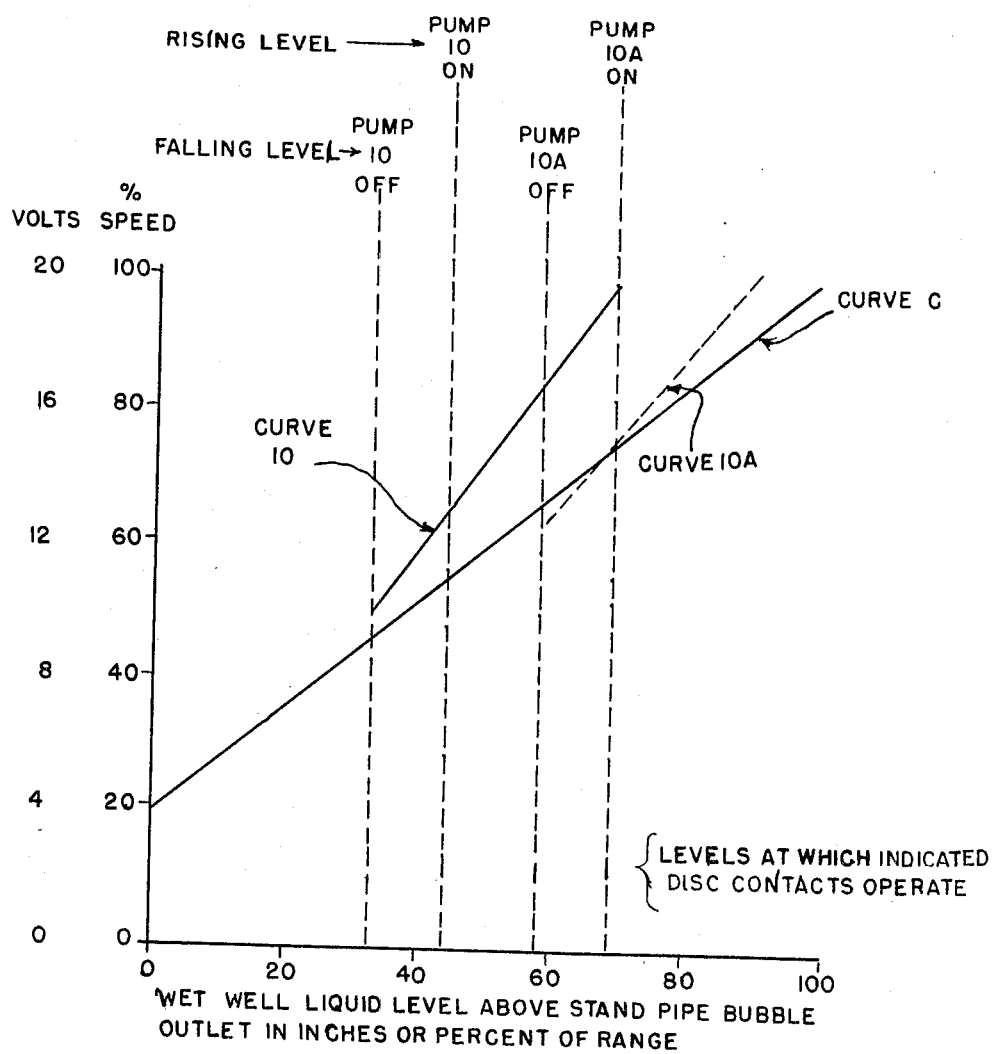

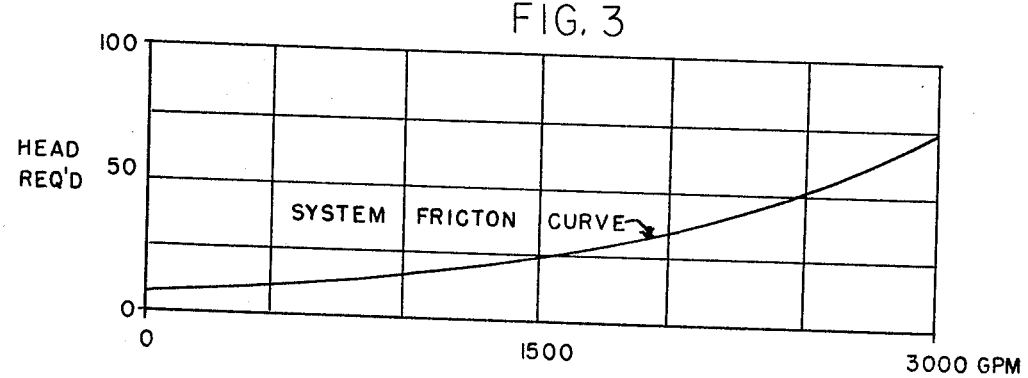
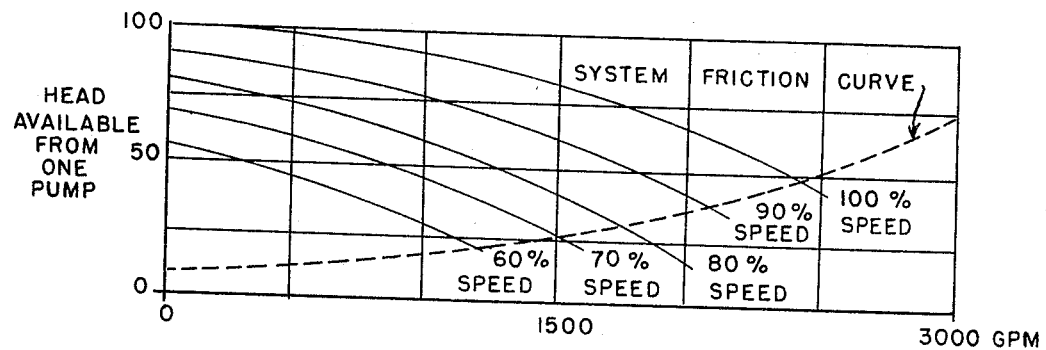
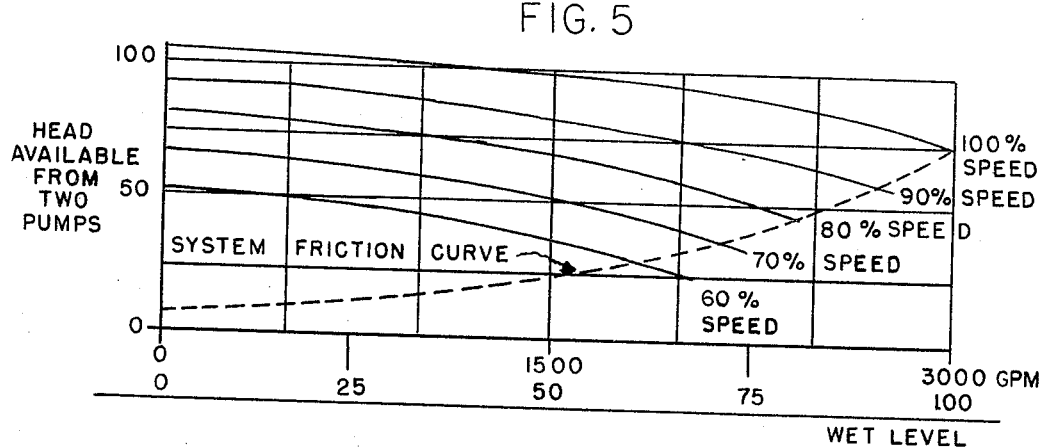

United States Patent Office 3,279,377
Patented Oct. 18, 1966

3,279,377
CONTROL FOR VARIABLE SPEED MULTIPLE PUMP SYSTEMS
Elton J. Jacobson, Hopkins, Minn., assignor to Electric Machinery Mfg. Company, Minneapolis, Minn., a corporation of Minnesota
Filed Oct. 22, 1964, Ser. No. 405,783
5 Claims. (Cl. 103—11)

The herein disclosed invention relates to multiple pump systems such as used for pumping sewage in a sewage lift station and has for an object to provide a control whereby the rate of pumping is controlled in accordance with the pumping demand.

Another object of the invention resides in providing a control for a system using two or more pumps and in which one or different multiples of pumps are set in operation as the occasion requires.

A still further object of the invention resides in providing a control in which the output of the pumps is varied in accordance with the pumping demand.

An object of the invention resides in utilizing electric motors for driving the pumps and employing eddy current slip drives for procuring the desired driving speeds of the motors.

Another object of the invention resides in using the elevation of the liquid being pumped in a wet well as an indication of the pumping requirement.

A still further object of the invention resides in using a stand pipe in the wet well open at its lower end and pumping air into said stand pipe which bubbles out of the lower end of the stand pipe and produces a pressure in the stand pipe proportional to the height of the liquid above the lower end of the stand pipe, said pressure operating a transducer producing an electrical voltage proportional to the height of the liquid in the well above the bottom of the stand pipe.

An object of the invention resides in providing a selector operated by the transducer which determines whether one or two motors for operating the pump shall be energized and when energization shall occur.

A still further object of the invention resides in providing a tachometer generator feedback closed loop control system for operating the electromagnetic eddy-current slip drive.

An object of the invention resides in providing circuitry utilizing the output voltage of the transducer for supplying signal voltage for operating the tachometer generator feedback closed loop control system.

Other objects reside in the novel combination of parts and in the circuitry hereinafter illustrated and or described.

In the drawings:

FIG. 2 is a graph illustrating the curve of the output of the transducer plotted against the height of the liquid in the wet well above the stand pipe outlet as well as the speed curves of the pumps plotted against the height of the liquid in the wet well above the stand pipe outlet.

FIGS. 3, 4 and 5 are graphs illustrating the output of the pumps plotted against available head.

Figure 1:
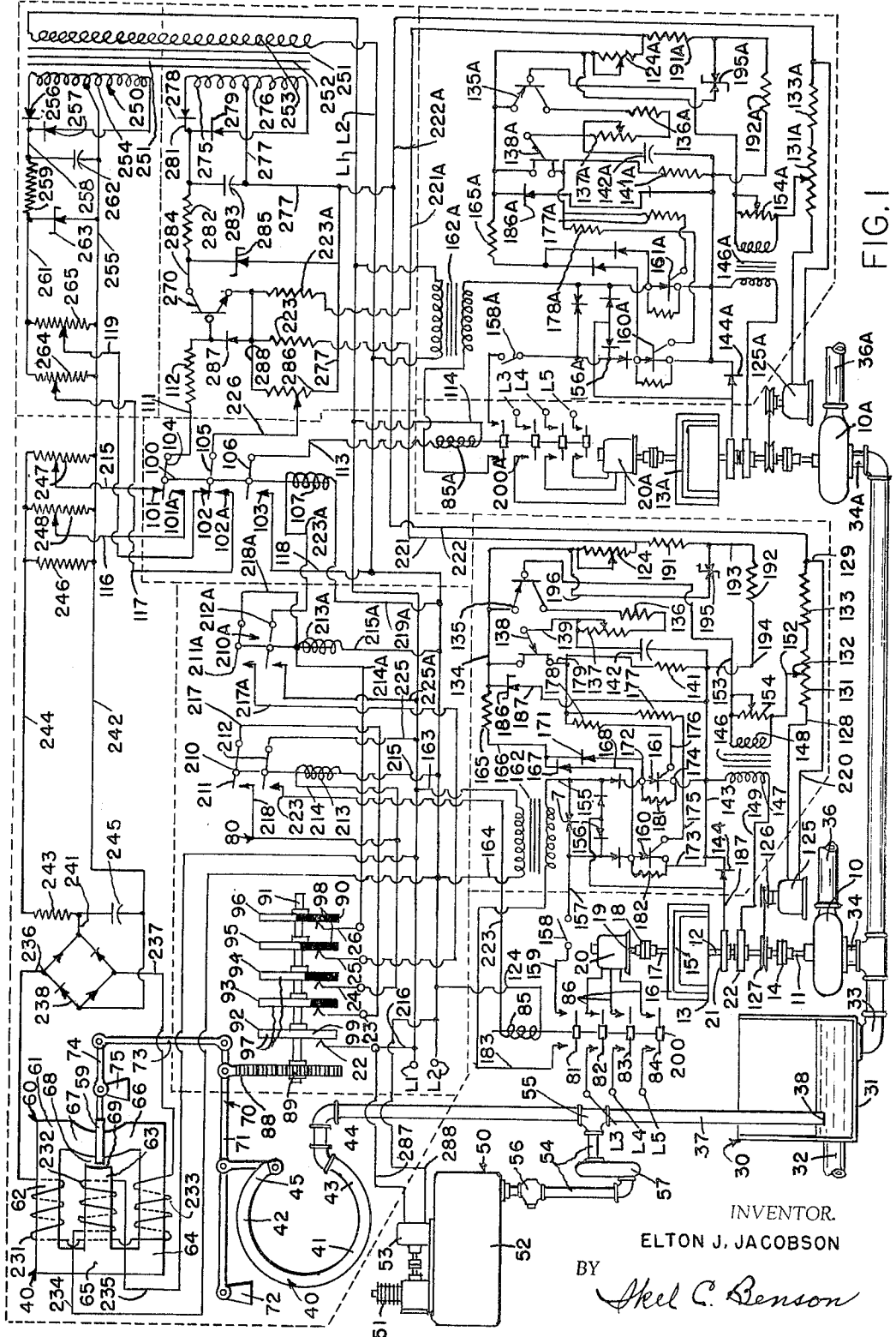
FIG. 1 is a wiring diagram illustrating an embodiment of the invention.

For the purpose of illustrating the invention, a control for a dual pump system has been illustrated and will be described though it can be readily comprehended that more than two pumps can be used. Applicant has found the control herein disclosed may also be used in combination with a pump using a single speed drive and which is always in operation when pumping is required.

*Pumping system*

The pumping system illustrated includes two pumps 10 and 10A, the controls for which are identical and which operate in the same manner. For this reason only the controls for pump 10 will be described, the same reference numerals with the suffix "A" added being used to designate the corresponding parts of the pump 10A.

The pump 10 has a driven shaft 11 which is coupled to the shaft 12 of an eddy current slip drive 13 by means of a coupling 14. This drive has an inner rotor 15 and to which shaft 12 is connected. The drive 13 further has an outer rotor 16 to which is secured a shaft 17. This shaft is coupled to the armature shaft 19 of a three phase electric motor 20 by means of a coupling 18. Slip rings 21 and 22 on the drive shaft 12 furnish current to the windings on rotor 14 and vary the speed of pump 10 in accordance with the current flowing in said windings.

*Sensing system*

For controlling the operation of the pumps, a sensing system 30 is employed which utilizes a wet well 31 having an inlet pipe 32. This well also has an outlet pipe 33, one branch of which is connected to the inlet of pump 10, and the other branch 34A of which is connected to the inlet of pump 10A. The outlets of these pumps have pipes 36 and 36A connected to them and which discharge the liquid pumped to the desired locality.

Installed in the wet well 31 is a stand pipe 37 which extends down toward the bottom of the well and whose lower end 38 is open and at all times submerged beneath the surface of the liquid. In conjunction with the stand pipe 37, a transducer 40 is employed which includes a gauge 41 having a Bourdon tube 42. One end 43 of this tube is fixed and the upper end 44 of the stand pipe 37 is connected to this end of the tube. The other end 45 of tube 42 is closed and is adapted to move in an up and down direction dependent upon the pressure in said tube. Stand pipe 37 is thus closed at its upper end.

Air is pumped into the stand pipe 37 at a locality above the height of the liquid in reservoir 31 and passes out through the open end of stand pipe 37 and bubbles up through the liquid in said well 31.

For the purpose, an air supply system 50 is employed which includes a compressor 51 which pump air into an air tank 52 through a passageway not shown. The compressor 51 is operated by an electric motor 53 which is energized in a manner to be subsequently described. Air is discharged from the tank 52 through pipe 54 which is connected to the stand pipe 37 by means of a T 55.

In the pipe 54 is located a pressure regulator 56 which discharges the air into stand pipe 37 at a fixed pressure. Also inserted in the pipe 54 is a purge rotameter 57. This instrument serves as a control valve and indicator of flow such as used with purge or bubble systems. In such systems the pressure in the stand pipe bears a definite relation to the height of the liquid in the wet well.

*Transducer*

The transducer 40 includes a variable differential transformer 60 which has a core 61 formed with three legs 62, 63 and 64. A yoke 65 connects said legs together at one end of each thereof. The core 40 includes another yoke 66 which connects the other ends of legs 62 and 64 together. This core has an arcuate portion 67. The other end of leg 63 falls short of the arcuate portion 67 to provide an air gap 68 therebetween. The end of the leg 63 is formed with a curved surface 69 concentric with the arcuate portion 67 of yoke 66. In this manner the length of the air gap 68 is uniform throughout. A short circuited coil or ring 59 is adapted to move in the air gap 68 and its position therein determines the flux in the legs 62 and 64.

For moving the ring 59, a linkage 70 is employed which is diagramatically illustrated. The construction shown depicts a lever 71 pivoted to a fixed support 72. Lever 71 is pivoted to the end 45 of the tube 42 by means of a link 46. This lever has another link 73 pivoted to it and which in turn is pivoted another lever 74. The lever 74 is pivoted to a fixed support 75 and which has fixedly mounted on it the ring 59. As the height of liquid in the reservoir 31 varies, the pressure in the Bourdon tube 42 varies and the free end 45 of said tube moves lever 71 and this through link 73 and 74 varies the position of the ring 59. When the ring 59 is in a central position, the same amount of flux flows through each of the legs 62 and 64 of core 61. When said ring is moved away from center more flux flows in one of said legs than the other. This phenomenon is used to determine the speed of one or both of the pumps 10 and 10A as will be presently described.

Selector

The selector of the invention is used to determine whether the pump 10 is to be used or both pumps 10 and 10A are to be used and is indicated by the reference numeral 80. This selector utilizes a ganged rotary switch 90 which has a shaft 91 on which are mounted discs 92, 93, 94, 95 and 96. These discs have contact portions 97 and insulating portions 98. The entire disc 92 is contacting and all of the contacting portions 97 of the discs 93, 94, 95 and 96 are connected to the disc 92. Contacting the discs 92, 93, 94, 95 and 96 are brushes 22, 23, 24, 25 and 26. The brush 22 is always in contact with the contacting surface 99 of disc 92. Normally the other brushes are in contact with the insulating portions 98 of the discs. Mounted on the shaft 91 is a spur pinion 89 which meshes with a rack 88. This rack is pivoted to the lever 71. When the pressure in the Bourden tube 42 increases, the end 45 thereof raises and likewise the rack 88. This turns shaft 91 in the direction indicated by the arrow. It will be noted that the junctures between the insulating portions and the conducting portions of the various discs 93, 94, 95 and 96 advance angularly with reference to one another. As the shaft 91 rotates, the brushes 23, 24, 25 and 26 successively contact the contact portions of the discs and close the switches formed thereby.

For operating the motors 20 and 20A, a three-phase alternating current electric line L3, L4 and L5 is employed. An electrically operated line switch 200 is also utilized. This line switch has individual switches 81, 82, 83 and 84. The switches of said line switch are normally held open by resilient means not shown and simultaneously closed by means of a solenoid 85. The line L3, L4 and L5 is connected to the switches 82, 83 and 84 and the leads 86 from the motor 20 are likewise connected to said switches.

For energizing certain of the apparatus of the invention, a single-phase alternating current line having conductors L1-L2 is employed. The line switch 200 for motor 20 is actuated by an electrically operated multiple switch 210. This switch includes two individual switches 211 and 212 normally open and adapted to be simultaneously closed by means of a solenoid 213. This solenoid is connected by means of a conductor 214 to the brush 24 of rotary switch 90 and by means of another conductor 215 to the conductor L2. A conductor 216 connects the brush 22 to conductor L1. The switch 211 of multiple switch 210 is connected by means of a conductor 217 to brush 23 and by means of another conductor 218 to the conductor 214. The switch 212 of multiple switch 210 is connected by means of a conductor 223 to the solenoid 85 of the line switch 200 which in turn is connected by means of a conductor 124 to the conductor L2. Switch 212 is further connected by means of a conductor 225 to conductor L1.

For energizing motor 20A, multiple switch 210A is employed which is identical with multiple switch 210. This switch is also provided with normally open switches 211A and 212A. Conductor 217A, however, goes to brush 25 and conductor 214A goes to brush 26. Conductor 223A instead of being connected directly to solenoid 85A of relay 80A is connected otherwise as will be explained later.

Transducer circuits

The core 61 of the transducer 40 has windings 231, 232 and 233 on the legs 62, 63 and 64 thereof and which due to the variations in flux produced by the shifting of ring 59 through the tube 42 and linkage 70 produces a signal which is utilized to control the operation of the pumps 10 and 10A. The winding 232 is connected by means of conductors 234 and 235 to the alternating current line L1-L2. The windings 231 and 233 are connected together and in series and produce fluxes in the legs 62 and 64 which travel in the same direction and which buck each other. The other ends of windings 231 and 233 are connected by means of conductors 236 and 237 to the input of a bridge rectifier 238. The output of this rectifier has connected to it two conductors 241 and 242. Conductor 241 is connected to a resistor 243 which in turn has connnected to it one side 244 of the signal line. Between the conductor 241 and conductor 242 is a capacitor 245. The resistor 243 and capacitor 245 serve to smooth out the ripples in the direct signal current produced by the bridge rectifier 238. Connected across the signal line 242–244 is a loading resistor 246 and two potentiometers 247 and 248.

The signal from line 242–244 is fed to a tachometer generator feedback closed loop control system 220 which operates the electromagnetic eddy current slip drive 13 or 13 and 13A. The two potentiometers 247 and 248 are connected to this control system and serve to vary the slope of the curve expressing the relationship between the height of the liquid in the wet well 31 and the speed of the pumps. Potentiometer 247 is for pump 10 and potentiometer 248 is for both pumps 10 and 10A operating at the same time.

To determine the positions of these curves, a power supuly 250 is employed. This power supply includes a transformer 251 which has core 252, a primary winding 253 and a secondary winding 254. The primary 253 is connected directly the line L1-L2. The secondary 254 is centertapped and connected to a conductor 255 which is connected to the conductor 242 forming one side of the signal line. The ends of the secondary 254 are connected to diodes 256 and 257 which are connected together by means of a conductor 258. This conductor is connected to a resistor 259 which in turn is connected to a conductor 261. Conductors 255 and 261 constitute a power line referred to as a positioning power line. Connected across the conductors 258 and 255 is a capacitor 262 and across the conductors 261 and 255 is a Zener diode 263. Capacitor 262 and resistor 259 serve to iron out the ripples of the voltage produced across conductors 258 and 255 while the Zener diode 263 serves as a voltage regulator producing a regulated voltage across conductors 255 and 261. Connected across the conductors 255 and 161 are two potentiometers 264 and 265 which serve to position the performance curves at the proper positions.

Signal amplifier

The signal from the transducer 40 and the output of transformer 251 are amplified by means of an amplifier 270. This amplifier utilizes an NPN transistor 271. For energizing this transistor a power supply 275 is employed which utilizes the transformer 251 previously referred to. This transformer has an additional secondary winding 276 which is centertapped and connected to a conductor 277. The ends of this winding are connected to rectifiers 278 and 279 which in turn are connected together by means of a conductor 281 and which is connected to a capacitor 283. A resistor 282 is connected to conductor 281 and to another conductor 284. Conductor 284 connects with the collector of transistor 171. The capacitor 283 and resistor 282 iron out the ripples in the direct current flowing in conductors 284 and 277. A Zener diode 285 serving as a voltage regulator is connected between conductors 284 and 277. Conductor 277 is connected to a potentiometer 286 which is connected by means of a conductor 288 to the emitter of transistor 270. A diode 287 is connected to conductor 288 and to the base of the transistor 270.

Switching

In conjunction with the signal line 242–244 the positioning power line 255–261 and the amplifier 270 ganged switch 100 is employed which comprises pairs of contacts 101, 101A, 102, 102A and a contact 103. Adapted to contact with these contacts are switch arms 104, 105 and 106. Switch arms 104 and 105 normally close circuits through contacts 101 and 102 and open circuits through contacts 101A, 102A and 103. A solenoid 107 when energized opens the circuits through contacts 101 and 102 and closes the circuits through contacts 101A, 102A and 103. Switch arm 104 is connected by means of a conductor 111 to a resistor 112 which in turn is connected to the base of transistor 270. Switch arm 105 is connected by means of a conductor 226 to the movable contactor 102 of switch 100. Switch arm 106 is connected by means of a conductor 113 with the solenoid 85A of selector 200A which in turn is connected by means of a conductor 114 to conductor L1. Contact 101 of switch 100 is connected by means of a conductor 215 to the movable contactor of potentiometer 247 while contact 101A is connected by means of a conductor 116 to the movable contactor of potentiometer 248. Contact 102 is connected by means of a conductor 119 to the movable contactor of potentiometer 265 while contact 102A is connected by means of a conductor 117 with the movable contactor of potentiometer 264. Contact 103 is connected by means of a conductor 118 with conductor L2. The solenoid 107 of switch 100 is connected by means of a conductor 223A to switch 212A while the other end of said solenoid is connected by means of conductor 219A to L2. Switch 212A is further connected by means of conductor 225A to conductor L1.

Tachometer feedback control

The tachometer feedback closed loop control for motor 20 is indicated in its entirety by the reference numeral 220. Current for operating this control is derived from conductors 221 and 222. Conductor 221 is connected to a resistor 223 which in turn is connected to the emitter of transistor 270. The resistor 112 is energized by the amplified signal derived from potentiometer 247. Conductor 222 is connected to conductor 277 which is the common return for the transistor circuit. Voltage is also procured from potentiometer 265 which is connected through conductor 119 through switch 102–105 and conductor 226 to potentiometer 286 to be added to the signal voltage. This combined voltage plus the voltage across a variable minimum speed resistor 124 has been termed the speed command voltage.

The control 220 also utilizes a tachometer generator 125 which has a sheave 126 belt driven from a sheave 127 on the shaft 12 of the eddy current slip drive 13 and which shaft drives the pump shaft 11. The output from this tachometer generator is connected to two conductors 128 and 129. Conductor 129 is connected to conductor 222 while conductor 128 is connected to one end of potentiometer 131 having a movable contactor 132. The other end of this potentiometer is connected to one end of a fixed resistor 133, the other end of which is connected to the conductor 222. The voltage between the conductor 132 and conductor 222 is the feedback voltage. The conductor 221 is connected to one end of the variable resistor 124, the other end of said resistor being connected to a conductor 134.

The error voltage, namely the difference between feedback voltage and the speed command voltage, is applied to the base circuit of a PNP input transistor 135. The emitter of the input transistor 135 is connected to the conductor 134 while the collector of said transistor is connected to one end of a fixed resistor 136. The other end of this resistor is connected to one end of a variable resistor 137. The other end of resistor 137 is connected by means of a conductor 139 to the emitter of a unijunction transistor 138. A condenser 142 is connected to the conductor 139 and to another conductor 143. This conductor is connected to a diode 144 which in turn is connected to the slip ring 21 mounted on shaft 12.

To prevent hunting in the operation of the invention, a stabilizing transformer 146 is employed having a primary 147 and a secondary 148. One side of the primary 147 is connected to the conductor 143 while the other side is connected to another slip ring 22 mounted on shaft 12 of the slip drive 13 by means of a conductor 149. Both slip rings 21 and 22 are connected to the windings of the slip drive 13. One side of the secondary 148 of transformer 146 is connected by means of a conductor 152 to the movable contactor 132 of potentiometer 131. The other side of said secondary is connected by means of a conductor 153 to the base of transistor 135. A variable resistor 154 shunts the secondary 148 of transformer 146.

Eddy-current slip drive control

Current is derived for energizing the winding of the eddy current slip drive through two silicon controlled rectifiers 160 and 161. These rectifiers are connected in parallel and are powered by an isolation transformer 162. The primary of this transformer is connected by means of conductors 163 and 164 to the alternating current line L1–L2. The secondary of isolation transformer 162 is connected at one end by means of a conductor 155 to one end of a bridge rectifier 156. The other end of this rectifier is connected by means of a conductor 157 to a manually operated switch 158. This switch is connected by means of a conductor 159 to the switch 81 operated by solenoid 85. Switch 81 is further connected by a conductor 183 to the other side of the secondary of transformer 162.

Conductor 134 is connected to a resistor 165 which in turn is connected through a conductor 166 to a diode 167. This diode is further connected by means of a conductor 168 to the anode of the silicon controlled rectifier 160. In a similar manner conductor 166 is connected to a diode 171 which in turn is connected by means of a conductor 172 to the anode of the silicon controlled rectifier 161. The cathodes of the silicon controlled rectifiers are connected by conductors 173 and 174 to the conductor 143. The gates of silicon controlled rectifiers 160 and 161 are connected by conductors 175 and 176 to resistors 177 and 178. Resistor 177 is connected by a conductor 179 to the first base of unijunction transistor 138 and resistor 178 is also connected to conductor 179 and likewise to the first base of said transistor. Resistors 182 and 181 are connected to the anodes and cathodes of the silicon controlled rectifiers 160 and 161 and serve as reverse leakage shunts which shift inverse voltage to the diodes 184 and 185.

The conductor 221 at the locality of its connection to resistor 124 is also connected to a fixed resistor 191. This resistor is connected to another resistor 192 by means of a conductor 193. Resistor 192 is further connected by a conductor 194 to the conductor 143.

For regulating the voltage to the minimum speed adjusting circuit and to provide a reference speed voltage when manual control is used, a Zener diode 195 is employed. This diode is connected to conductor 193 and by means of a conductor 196 to conductor 134.

Diodes 167 and 171 give full wave supply voltage to the pulse control circuit during part of the power cycle that the silicon controlled rectifiers are not conducting.

A Zener diode 186 is connected to the conductor 134 and also to a conductor 187 which in turn is connected to conductor 143. This diode and resistor 265 limit the voltage to the transistors 135 and 138 to a safe value. The selenium surge suppressor 7 limits voltage transients from the L1-L2 line to a value less than the rating of the power circuit semiconductors 156, 160, 161 and 144.

It has been found that the following value of components operate successfully for two, three-phase 40 horsepower motors driving two 150,000 gallon per hour pumps.

Resistors:

| | | |
|---|---|---|
| 246 (½ watt) | ohms | 25,000 |
| 247 (½ watt) | do | 50,000 |
| 248 (½ watt) | do | 50,000 |
| 264 (½ watt) | do | 10,000 |
| 265 (½ watt) | do | 10,000 |
| 259 (2 watts) | do | 3,000 |
| 282 (2 watts) | do | 1,000 |
| 112 (½ watt) | do | 6,800 |
| 286 (½ watt) | do | 10,000 |
| 223 (½ watt) | do | 1,000 |
| 165 (10 watts) | do | 2,500 |
| 154 (½ watt) | do | 100 |
| 131 (4 watts) | do | 400 |
| 133 (2 watts) | do | 200 |
| 192 (5 watts) | do | 1,000 |
| 136 (½ watt) | do | 1,500 |
| 137 (1 watt) | do | 15,000 |
| 124 (2 watts) | do | 600 |
| 191 (2 watts) | do | 400 |
| 178 (½ watt) | do | 10 |
| 177 (½ watt) | do | 10 |
| 141 (½ watt) | do | 39 |
| 181 (1 watt) | megohm | 0.1 |
| 182 (1 watt) | megohm | 0.1 |

Capacitors:

| | | |
|---|---|---|
| 262 (12 mfd) | volts | 75 |
| 283 (12 mfd) | do | 75 |
| 142 (0.5 mfd) | do | 25 |

The curves shown in FIGS. 2, 3, 4 and 5 illustrate the performance of the invention. In FIG. 2 curve 10 is a curve plotted with wet well liquid level as against speed of pump 10. Curve 10A is similar to curve 10 for pump 10A and pump 10 in parallel. The positions 2, 3, 4 and 5 indicate the levels at which the pumps turn on and off. It will be noted that both pumps turn on at a higher liquid level than they turn off. This is for the purpose of preventing excessive turning on and off of the pumps for slight variations in the liquid level. Curve C is plotted against the wet well liquid level and the volts of the transducer. It will be apparent from this curve that the demand substantially follows a straight line.

The curve shown in FIG. 3 is the demand curve for the system. This curve is plotted in gallons per minute as against the head required. In FIG. 4 the curve shown in FIG. 3 is shown in dotted lines and the output of one pump at different speeds is shown in full lines. This curve is also plotted in gallons per minute as against the head. In FIG. 5 is shown the same curve as in FIG. 3, but in this case the output of both pumps together at various speeds is illustrated. These curves are plotted in gallons per minute as against the head in the wet well.

The method of operation of the invention is as follows: The liquid level in the wet well 31 is used to determine the rate of pumping the liquid being discharged into said well. For the purpose, the stand pipe 37 is employed which is emersed in the liquid in said wet well to a position near the bottom thereof. The stand pipe 37 is closed at its upper end by means of the Bourdon tube 42. Air under pressure is forced into the stand pipe 37 by means of compressor 51 which trickles out of the lower end of the stand pipe. This creates a pressure in said stand pipe which bears a certain relation to the height of the liquid in the wet well above the lower end of the stand pipe. Such pressure is transmitted to the gauge 41 and the end 45 of said gauge is moved upwardly as the pressure increases. Such movement lifts lever 71 and depresses lever 74 changing the position of ring 59 on core 61. Since coils 231 and 233 are bucking, flux travelling through the longer leg produces a signal, the strength of which varies with the height of the liquid in the wet well. This signal is rectified by the rectifier 238 and fed to a signal line 242-244. Condenser 245 and resistor 243 smooth out the ripples in the voltage of the signal current.

At the same time that a signal is impressed on line 242-244, rack bar 88 rotates pinion 89 and correspondingly shaft 91. When the level in the wet tank 31 is below the level of the lower end of stand pipe 37 no pumping is required and the parts of the control are as shown in FIG. 1. In this figure switches 23, 24, 25 and 26 are open, the contact brushes thereof being on the insulated portions 98 of the discs 93, 94, 95 and 96. As the pressure in the wet well rises, the contacting portion 97 of disc 93 makes contact with brush 23. This brush is connected by conductor 217 to switch 211 of multiple switch 210. This switch being open nothing happens. As the pressure increases still further, the contacting portion of disc 94 makes contact with brush 24 and a circuit is now completed, starting with conductor L1 of the A.C. line and running through conductor 216, brush 22, disc 92, disc 93, disc 94, brush 24, conductor 214, solenoid 213, conductor 215 to conductor L2 of the A.C. line. Multiple switch 210 now closes. This closes switch 211 of said multiple switch 210. Another closed circuits is now established starting with conductor L1 and running through conductor 216, brush 22, disc 92, disc 93, brush 23, conductor 217, switch 211, conductor 218, conductor 214, solenoid 213 and conductor 215 to conductor L2 of the A.C. line. This circuit parallels the switch including the contacting portion of disc 94 and brush 24 and maintains multiple switch 210 closed until said circuit is opened by the brush 23 reaching the insulating portion 98 of disc 93. Another circuit is also completed, starting with L1 of the A.C. line and running through conductor 225, switch 212, conductor 223, solenoid 85 of line switch 200 and through the conductor 124 to the conductor L2 of the A.C. line. This actuates the line switch 200 and the switches 81, 82, 83 and 84 are closed. Three phase alternating current is now fed to motor 20 from line L3-L4-L5 and through conductors 86. The motor now drives shaft 19 and the pump 10 through the eddy current slip drive 13.

The output from the transducer 80 and across resistor 247 is transmitted from conductor 244 through the tapped portion of resistor 247, conductor 215, switch 101-104, of gang switch 100, conductor 111, resistor 112 and to the base of transistor 271. The return for the signal is from the emitter of said transistor through conductor 288, the tapped portion of resistor 286, conductor 226, switch 105-102 of gang switch 100, conductor 119 and through the tapped portion of resistor 265 to the common conductor 242-255. The position of the movable arm of potentiometer 247 determines the percentage of the signal voltage utilized and also the inclination of the signal voltage-liquid elevation curve of the control indicated by reference numeral 10. The position of the movable arm of the potentiometer 265 determines the position of said curve in the liquid elevation direction. The voltage across potentiometers 264 and 265 is procured from the transformer 251 and through the full wave rectifier using diodes 256 and 257.

The secondary 276 of power supply 275 furnishes smooth regulated current between the emitter and collector of the transistor 271. The amplified signal current modified by the current passing through the tapped portion of resistor 265 is fed through resistor 223 and through conductor 221 to the eddy current slip drive circuits. A return path for this current is had through conductor 222, and to return conductor 277 of power supply 275. Conductor 277 also conducts through the tapped portion of resistor 286 through conductor 226, switch 105, conductor 116 and through the tapped portion of resistor 265 to the return conductor 255 of power supply 250.

The potentiometer 246 is a load matching resistance to provide the proper load to the pressure transducer. Resistors 223 and 223A are current limiting resistors.

The speed signal voltage is the voltage between the conductors 221 and 222, while the voltage between the conductors 134 and 222 is the command voltage. When gang switch 210 closes, the command voltage is connected to conductors 134 and 222 and at the same time motor 20 is energized and the eddy current slip drive driven through shaft 19. The elevation in the wet well 31 being low, the shaft 12 drives the pump 10 at a low rate of speed. Correspondingly tachometer 125 is also driven at a low rate of speed. The output of the tachometer is applied to the load consisting of resistor 133 and potentiometer 131. The voltage across resistor 133 and a portion of the voltage across potentiometer 131 is applied to the transistor 135. This is accomplished by current flowing through the tap 132 of potentiometer 131, through conductor 152, the secondary 148 of stabilizing transformer 146 and conductor 153 to the base of transistor 135. The tachometer being connected in bucking relation to the command voltage the resulting voltage applied between the collector and base of said transistor becomes the difference between the command voltage minus the tachometer feed-back voltage which is referred to as the error voltage.

Assume now that the shaft 12 is running at the desired speed and such speed is being maintained, potentiometer 131 being set for such speed. At such position of the potentiometer 131 the voltage of the tachometer 125 is below that of the command voltage. A negative voltage is hence impressed on the base of transistor 135. Current hence flows through the emitter and collector of said transistor through resistor 136, resistor 137 and through capacitor 142 to the common return 143 of the eddy current slip drive winding. The voltage at the emitter of silicon unijunction transistor being less than the firing voltage of said transistor said transistor does not conduct and the voltage from transistor 135 charges condenser 142 through resistors 136 and 137. The voltage across this condenser hence starts to build up. When the voltage across the condenser 142 reaches the firing voltage of the silicon unijunction transistor 138, said transistor fires and allows the charge accumulated in condenser 142 to discharge through conductor 139, the emitter of silicon unijunction transistor 138, the first base of said transistor and to the gate of silicon-controlled rectifier 160 through resistor 177 and the gate of silicon controlled rectifier 161 through resistor 178. The silicon controlled rectifier with forward voltage from anode to cathode then fires and conducts from the full-wave rectifier 156 to the common conductor 143. Current flows from this conductor through the primary 147 of stabilizing transformer 146 through conductor 149 and to slip ring 22. The return path of the current is from slip ring 21 through conductor 187 and to rectifier 156. The current passed by these silicon controlled rectifiers are flat-top pulses, one for each half cycle. The elapsed portion of the pulse cycle before the rectifiers fire determines the amount of power fed to eddy current slip drive winding. When the eddy current slip drive is running at the proper speed, the instant of firing of the silicon controlled rectifiers is maintained at such time as will produce the desired current flowing through the eddy current slip drive winding.

Suppose now that the liquid in the wet well 30 rises. This increases the pressure in the stand pipe 37 which moves the Bourdon tube 40 in a manner to shift the position of ring 59 to increase the signal to amplifier 270. This increases the command voltage. The error voltage would also increase and the negative bias on the transistor 135 would increase. This would cause the capacitor 142 to charge more quickly. Since the elapsed portion of the pulse cycle before the rectifiers fire determines the amount of power fed to the eddy current slip drive winding, the current would be increased and the motor 20 would drive the pump 10 through the eddy current slip drive at a higher rate of speed. Thus the volume pumped would be proportional to the height of the liquid in the wet tank. If the liquid in the wet tank rose still higher, the pressure in the Bourdon tube 240 would increase the flux in transformer core 61 and correspondingly increase the rotation of the shaft 91. This would continue until the brush 25 engaged the contact portion 97 of disc 95. The circuit through brush 25 and disc 95 however breaks at the open switch 211A of gang switch 210A. Nothing then happens. When, however, the liquid in the tank 30 reaches a still higher level brush 26 would engage the contacting portion 97 of disc 96 and complete a circuit commencing with the conductor L1 of the A.C. line L1–L2. The circuit would include conductor 216, brush 22, disc 93, disc 96, brush 26, conductor 214A, the solenoid 213A of the gang switch 210A and conductor 215A to conductor L2. This would close switch 211A and complete the circuit through brush 25 and disc 95 and the solenoid 213A of gang switch 210A. This circuit would then serve as a holding circuit for the switch 211A. At the same time switch 212A would be closed which would complete a circuit from conductor L1 through conductor 225A, switch 212A, conductor 223A and the solenoid 107 of gang switch 100 and conductor 219A to conductor L2. Moving switch arm 104 from the position shown in FIG. 1 to a position contacting the contact 101A would connect the potentiometer 248 with the amplifier 270. At the same time potentiometer 264 would be connected through contact 102A and switch arm 105 with the amplifier 270. Switch 106 when closed would provide a circuit from L2 of line L1–L2 through a conductor 118, contact 103, switch arm 106 and conductor 113 to the solenoid 85A of motor 20A for pump 10A. At the same time, motor 20A would be started and voltage delivered to the circuitry in connection with said motor through the conductors 221A and 222A. The operation of this part of the invention would be the same as that previously described excepting the voltage would come from resistor 223A. Operation of the second part would be identical to the first part and would merely supplement it. Thus, both motors would be in operation at the same time.

When the level of the liquid in the wet tank 30 drops the reverse procedure results and the slip drive 13A and motor 20A slows down to reduce the output of the pump 10A. This motor and the circuitry associated therewith is not, however, cut out until the shaft 91 has been rotated to bring both the insulating portion 78 of disc 96 and also 95 into contact with the brushes 26 and 25. The same is true if the liquid level drops still lower. The motor 20 does not shut off until the insulating portions 98 of the discs 93 and 94 have reached the brushes 23 and 24.

The advantages of the invention are manifest. The system is entirely automatic. The pump speed of the motors provide pumping rates that exactly match the flow rates. Hence a reduction in the number of pumping units and a reduction in the size of the wet well results. With the instant invention, continuous flowing is produced even at low rates to that settling of solids in the wet well and discharge means is clearly reduced. Power savings are obtained, especially where there is an assigned range of flow plus a significant friction head. In some instances the size of the main pipe may be reduced.

Changes in the specific form of the invention, as herein described, may be made within the scope of what is claimed without departing from the spirit of the invention.

Having described the invention, what is claimed as new and desired to be protected by Letters Patent is:

1. Control means for a variable speed motor driven multiple pump system having:
   (a) a plurality of pumps,
   (b) individual motors for each of said pumps,
   (c) an electromagnetic slip drive driven by each of said motors and driving the corresponding pump,
   (d) a wet well into which the liquid to be pumped is directed,
   (e) the inlet to each pump being connected to said well,
   (f) sensing means subject to the height of the liquid in said wet well and having a moving part adapted to move on changes in the elevation of the liquid in the wet well,
   (g) a linkage operated by said sensing means,
   (h) a transducer having a movable part connected to said linkage,
   (i) said transducer providing a variable signal voltage corresponding with the elevation of the liquid in said wet well, and
   (j) means operated by the voltage of said transducer for energizing said slip driver;
   (k) the combination of means for varying the rate of change of the voltage operating each slip drive.

2. Control means for a variable speed motor driven multiple pump system having:
   (a) a plurality of pumps,
   (b) individual motors for each of said pumps,
   (c) an electromagnetic slip drive driven by each of said motors and driving the corresponding pump,
   (d) a wet well into which the liquid to be pumped is directed,
   (e) the inlet to each pump being connected to said well,
   (f) sensing means subject to the height of the liquid in said wet well and having a moving part adapted to move on changes in elevation of the liquid in the wet well,
   (g) a linkage operated by said sensing means,
   (h) a transducer having a movable part connected to said linkage,
   (i) said transducer providing a variable signal voltage corresponding with the elevation of the liquid in said wet well;
   (j) the combination of individual means utilizing a predetermined portion of the variable signal voltage of the transducer for operating each of said slip drives.

3. Control means for a variable speed motor driven multiple pump system having:
   (a) a plurality of pumps,
   (b) individual motors for each of said pumps,
   (c) an electromagnetic slip drive driven by each of said motors and driving the corresponding pump,
   (d) a wet well into which the liquid to be pump is directed,
   (e) the inlet to each pump being connected to said wet well,
   (f) sensing means subject to the height of the liquid in said wet well and having a moving part adapted to move on changes in elevation of the liquid in the wet well,
   (g) a linkage operated by said sensing means,
   (h) a transducer having a movable part connected to said linkage,
   (i) a transducer circuit energized by said voltage;
   (j) the combination of a plurality of voltage dividers in said transducer circuit one for each pump and
   (k) a plurality of slip drive circuits connected to said voltage dividers and separately operating said slip drives.

4. Control means for a variable speed motor driven multiple pump system having:
   (a) a plurality of pumps,
   (b) individual motors for each of said pumps,
   (c) an electromagnetic slip drive driven by each of each motors and driving the corresponding pump,
   (d) a wet well into which the liquid to be pumped is directed,
   (e) the inlet to each pump being connected to said wet well,
   (f) sensing means subject to the height of the liquid in said wet well and having a moving part adapted to move on changes in elevation of the liquid in the wet well,
   (g) a linkage operated by said sensing means, and
   (h) a transducer having a movable part connected to said linkage;
   (i) the combination of individual means for combining with the variable signal voltage of the transducer a predetermined fixed voltage for each slip drive.

5. Control means for a variable speed motor driven multiple pump system having:
   (a) a plurality of pumps,
   (b) individual motors for each of said pumps,
   (c) an electromagnetic slip drive driven by each of said motors and driving the corresponding pump,
   (d) a wet well into which the liquid to be pumped is directed,
   (e) the inlet to each pump being connected to said wet well,
   (f) sensing means subject to the height of the liquid in said wet well and having a moving part adapted to move on changes in elevation of the liquid in the wet well,
   (g) a linkage operated by said sensing means, and
   (h) a transducer having a movable part connected to said linkage,
   (i) said transducer providing a variable direct current voltage corresponding with the elevation of the liquid in said well;
   (j) a transducer circuit energized by said voltage;
   (k) the combination of a plurality of voltage dividers in said transducer circuit, one for each pump,
   (l) a plurality of slip drive circuits connected to said voltage dividers and separately operating said slip drivers,
   (m) an auxiliary circuit energized by a substantially constant direct current,
   (n) a plurality of voltage dividers in said auxiliary circuit, one for each pump and
   (o) means for impressing the voltages from said last named voltage dividers on said slip drive circuits with the voltages thereof opposing the voltages derived from the first named potentiometers.

References Cited by the Examiner
UNITED STATES PATENTS

| | | | |
|---|---|---|---|
| 1,987,466 | 1/1935 | Collin | 103—25 |
| 2,727,202 | 12/1955 | Lanfers et al. | 318—447 |
| 2,733,660 | 2/1956 | Towle et al. | 103—35 |
| 3,021,789 | 2/1962 | Ryden | 103—35 |
| 3,024,730 | 3/1962 | Towle | 103—11 |
| 3,043,226 | 7/1962 | Camp | 103—35 |
| 3,193,183 | 7/1965 | Ruhala | 103—16 |

MARK NEWMAN, *Primary Examiner.*

W. L. FREEH, *Assistant Examiner.*